United States Patent [19]
Anderson

[11] Patent Number: 4,524,994
[45] Date of Patent: Jun. 25, 1985

[54] FLOWABLE CONCRETE DELIVERY HANDLING APPARATUS

[76] Inventor: William T. Anderson, P.O. Box 395, Dover Plains, N.Y. 12522

[21] Appl. No.: 402,936

[22] Filed: Jul. 29, 1982

[51] Int. Cl.³ ............................................. F16L 35/00
[52] U.S. Cl. ......................................... 285/38; 285/5; 285/39; 285/61; 285/235; 285/365; 222/527; 425/62
[58] Field of Search ................ 285/61, 38, 5, 39, 235, 285/236, 365; 239/712, 719; 141/231; 137/899; 406/38, 44, 109, 185, 164, 165, 196; 222/527, 608; 425/60, 62; 264/31, 333; 280/12 R

[56] References Cited

U.S. PATENT DOCUMENTS

| | | | |
|---|---|---|---|
| 1,098,853 | 6/1914 | Szczepkowski et al. | 239/712 |
| 2,702,717 | 2/1955 | Cornelius | 285/5 X |
| 2,796,292 | 6/1957 | Maggart | 239/712 |
| 2,860,008 | 11/1958 | Jacoby | 239/718 |
| 3,188,145 | 6/1965 | Strong | 406/44 X |
| 3,342,504 | 9/1967 | Seaton et al. | 280/12 R |
| 3,485,515 | 12/1969 | Frishof | 285/5 |
| 4,272,021 | 6/1981 | Standal | 239/106 |

FOREIGN PATENT DOCUMENTS 539968 12/1931 Fed. Rep. of Germany .......... 285/5
273177 5/1934 Italy ........................................ 285/5

OTHER PUBLICATIONS

Construction Forms Catalog, pp. 2, 14, 15.

*Primary Examiner*—Dave W. Arola
*Attorney, Agent, or Firm*—Ralph R. Roberts

[57] ABSTRACT

A flowable concrete delivery apparatus is provided in which both rigid and flexible pipe is connected in an end-to-end relationship to provide a high pressure conduit. These lengths of pipe are connected by clamps, each clamp being fixedly secured to a skid that provides a sliding protector for the clamp and prevents unwanted opening and damage to the clamp. The pipe lengths are carried by freely rotating wheels, each having a sleeve that provides a free fit on the outer diameter of a pipe length. The conduit is moved by a hook tool, this tool having one end formed with a handle and the other end with a bifurcated hook that is contoured to releaseably engage the outer diameter of a pipe. An attendant manipulates and moves this hook tool to position and arrange the conduit pipe in the desired delivery position. Although a great convenience, the hook tool is not required by the attendant in every instance as the wheels enable the attendant to grasp and move the pipe conduit when the occasion arises.

14 Claims, 12 Drawing Figures

FLOWABLE CONCRETE DELIVERY HANDLING APPARATUS

BACKGROUND OF THE INVENTION

1. Field of the Invention

With reference to the classification of art as established in and by the United States Patent and Trademark Office this invention is believed to be found in the general class entitled, "Conveyors, Fluid Current" (Class 406) and the subclasses entitled, "load flow diverter, divider or combined-movable conduit section" (Subclass 182) and in the subclass entitled, "carrier-wheeled" (Subclass 185). As the concrete delivered by the apparatus of this invention is pumped, such pumps are believed to be found in the general class entitled, "pumps" and the subclass therein entitled, "slurry pumps" (Subclass 900). Patents pertaining to irrigation are noted and this general class entitled, "fluid sprinkling, spraying and diffusing" (Class 239) and the subclasses 712 and 718 were also reviewed.

2. Description of the Prior Art

Pumps for moving flowable concrete from a mixing source to a defined discharge area are well known and in recent years have become the economical and practical means for producing and placing concrete for use as floors, roofs, walls and roadways. The cost of materials and the closely monitored supplying of concrete to surfaces and as strength members has brought to the fore the necessity of rapid deployment of the delivered concrete so that spreading and/or finishing can be achieved within an allotted and relatively short time span.

Concrete is conventionally prepared in mixing means and when and where pumped the pipe which is used to convey the mix is conditioned by initially coating the interior of the pipe with slurry. After this coating a fluid concrete mix containing aggregate may be initially provided having a slump measuring seven to eight inches but almost immediately the mix must and does become that which is specified. Usually production concrete has a slump of two to four inches but is supplied to specification. Such mix is rapidly spread after delivery and the use of a conventional concrete pump for supplying floors and the like is well known.

The pipe associated with concrete pumping usually is about four inches in diameter. Larger and small diameters of pipe are known but the capability and maneuverability of the pipe is also a great consideration. Prior to this invention the use of wheels to support determined lengths of pipe have not included intermediate lengths of flexible pipe providing means to easily change the position of delivery. The use of wheels on pipe assemblies has been mainly for irrigation systems many of which include motor means to move the spray systems around a fixed center and these systems provide circular patterns. The handling of flowable concrete in pipe conduits for safe manipulation by as few as two attendants has not been known to Applicant prior to this invention.

A careful pre-Ex search was made in both the United States and foreign patents. Many patents were found pertaining to water sprinkling (irrigation) with wheel supported pipe lengths adapted to water circular areas and in some patents the apparatus was attendant manipulated and moved. Among these patents were U.S. Pat. 1,098,853 to VON SZCZEPKOWSKI, et al. as issued on June 2, 1914; U.S. Pat. No. 2,702,717 as issued to CORNELIUS on Feb. 22, 1955; U.S. Pat. No. 2,796,292 as issued to MAGGART on June 18, 1957; U.S. Pat. No 2,860,008 as issued to JACOBY on Nov. 11, 1958; U.S. Pat. No. 3,342,504 as issued to SEATON et al. on Sept. 19, 1967; and U.S. Pat. No. 4,272,021 as issued to STANDAL on June 9, 1981.

The above identified U.S. Patents are all directed to water irrigation. Wheels for moving the connected pipe are shown in all but SEATON, U.S. Pat. No. 3,342,504. Manipulating means for moving the pipe does not contemplate a flexible intermediate portion allowing the connected pipe to be manipulated for a controlled discharge point. These patents show, teach and suggest irrigation from spray heads spaced along the extents of pipe. Irrigation and discharge through spray heads are not contemplated with and by the apparatus of this invention. SEATON shows a skid and connector for carrying a pipe and spray head specifically for irrigation pipe and arranged to secure pipe at two spaced apart positions. Drain apparatus as in STANDAL is also not contemplated in Applicant's device.

SUMMARY OF THE INVENTION

This invention may be summarized, at least in part, with reference to its objects.

It is an object of this invention to provide, and it does provide, a flowable concrete delivery apparatus wherein a plurality of lengths of pipe are connected to provide a conduit for flowable concrete. These lengths are supported by wheels that are free turning on the pipe and support the pipe lengths for easy manipulation and movement. Intermediate the assembled conduit of pipe is a flexible pipe length allowing bending of the assembled conduit to bring the discharge point to a determined location. The manipulation of this conduit is by attendants with pipe hooks. Skids are depicted in two embodiments and provide assists for the manipulation of the pipe.

It is a further object of this invention to provide, and it does provide, flowable concrete delivery apparatus in which the conduit is of a plurality of rigid pipe lengths assembled end-to-end by and with flange connections. At least one flexible length of pipe is interposed in the assembly to provide bending capability easily achieved by an attendant by and with a manipulating hook device. Wheels are provided for supporting the pipe conduit, but skids are used for assist in the support and manipulation of said pipe. Each skid provides coupling means to rapidly secure the ends of the pipe together. In a first embodiment a skid is shown with handle means by which the pipe can be and is lifted and the coupled conduit is moved or redirected. The other or second embodiment provides a coupling clamp with a skid plate to prevent the clamp from engagement with or dislodgement by the wire grid or mesh usually provided in the laying of concrete. The clamps secure the pipe lengths together and with an O-ring gasket at each joint provide rapid coupling of the multiple lengths together. The pumping of concrete contemplates high pressures in the conduit. The construction of the pipe conduit and gaskets used therewith is known in the art.

In brief, this flowable concrete delivery system contemplates ten foot lengths of four inch pipe having flange connections at each end. At least one flexible length of pipe is also used intermediate the pipe conduit. This flexible length of pipe allows the pipe conduit to be bent so that the discharge end is at the position desired.

Wheels are provided for supporting each length of pipe above the surface (usually reinforcing wire mesh, grid or lath) which is to be surfaced with concrete. Skids are also contemplated to be used with the pipe. Manipulating hooks are provided so that an attendant may selectively grasp or engage a pipe length and move the pipe conduit to a desired position. These manipulating hooks are adapted to be individually used by an attendant and the conduit moved by said attendant as he selects.

The pipe lengths are connected by clamps which secure conduit pipes in an end-to-end relationship. These pipe clamps enable rapid connecting and disconnecting of said lengths. Safety rules and regulations, many of which are state mandated, determine the permissible construction and assembly parameters of the conduit construction. As the clamp means is not to be accidentally disconnected and weakened by wear the present invention shows two clamps and skid assemblies. Each embodiment insures that the clamp does not engage the wire mesh, grid or the like and wear is prevented by presenting a skid member to the contacting support surface.

In a first embodiment the clamp and skid combination is provided with manipulating and lift handles. These handles are disposed to be selectively extended or to be moved to a closed condition for storage. The clamp skid apparatus provides a clamp for end-to-end connection of two adjacent pipe lengths and an attached skid provides an insurance against unwanted engagement with a lower surface. An alternate skid assembly is also provided with a clamp for retaining two adjacent pipe lengths and a skid member to prevent wear and/or damage to the securing clamp. The attachable clamps and skids are easily removed when the pipe conduit is disassembled for cleaning, storage and/or transport.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen a specific embodiment of a flowable concrete delivery handling apparatus with hook and skid means. Skid apparatus are shown in two embodiments as adopted for use with wheeled support of the conduit and showing a preferred means for manipulating the concrete conduit with one or two attendants. The apparatus in a preferred arrangement has been chosen for the purpose of illustration and description as shown in the accompanying drawings wherein:

BRIEF DESCRIPTION OF THE DRAWINGS

In the following description and in the claims various details are identified by specific names for convenience. These names are intended to be generic in their application. Corresponding reference characters refer to like member throughout the several figures of the drawings.

The drawings accompanying, and forming part of, this specification disclose details of construction for the purpose of explanation but structural details may be modified without departure from the concept and principles of the invention and the invention may be incorporated in other structural forms than shown.

Figure 1:
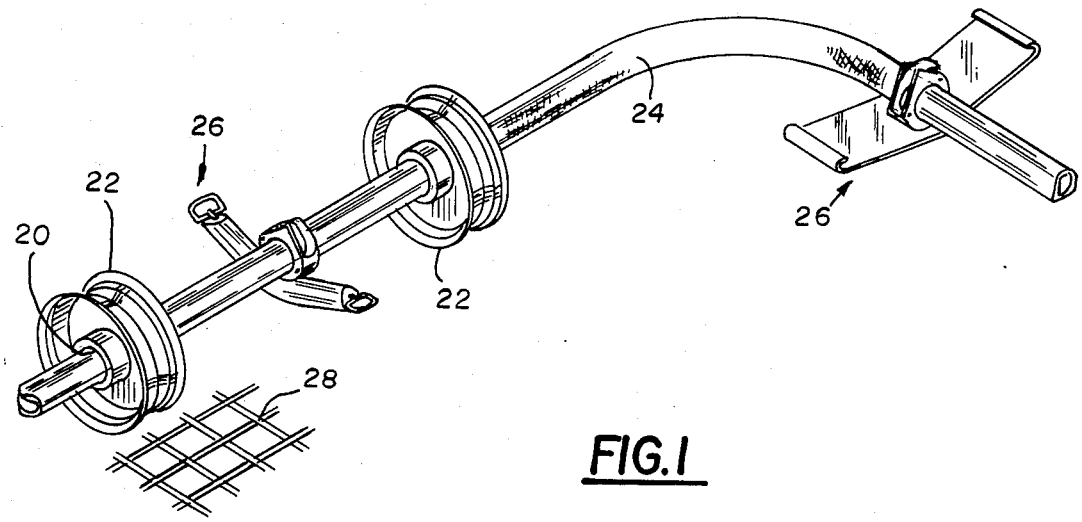
FIG. 1 represents a somewhat fragmentary and diagrammatic isometric view of a flowable conduit for concrete and the like, said conduit carried on wheel supports and with this conduit including at least one flexible pipe section at an intermediate position providing for the manipulation of the discharge end at selected positions.
Figure 3:
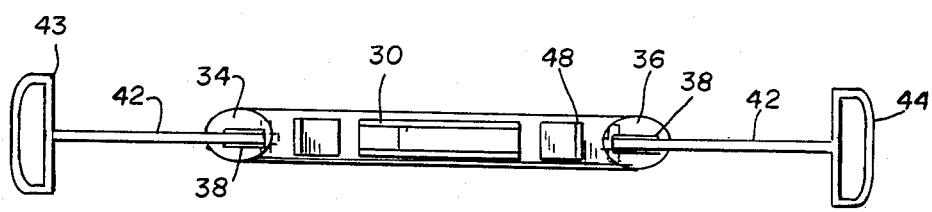
FIG. 3 represents a plan or top view of the clamp skid of FIG. 2, this view taken on the line 3—3 thereof and looking in the direction of the arrows.

Embodiment of FIG. 1

Figure 12:
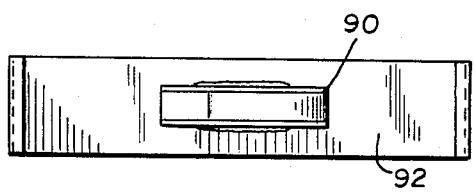
Figure 11:
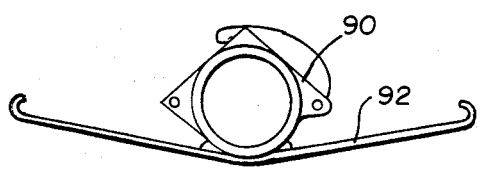
FIG. 11 represents a side view of an alternate skid clamp by which the pipe sections are secured together and with the attached skid means insuring that the clamp does not engage a grid of wire mesh and the like, and FIG. 12 represents an end view of the clamp of FIG. 11, this view taken on the line 12—12 thereof and looking in the direction of the arrows.
Figure 5:
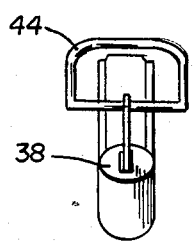
FIG. 5 represents a fragmentary and partly diagrammatic sectional end view of the clamp skid as taken on the line 5—5 of FIG. 2 and looking in the direction of the arrows.

Referring now and next to the drawings there is diagrammatically shown in FIG. 1 a concrete delivery conduit employing a plurality of pipe lengths 20 joined end-to-end by clamp means to be hereinafter more fully described in conjunction with the skid apparatus. Preferably, each pipe length is about ten feet in length and supporting each pipe member is a freely turning wheel generally identified as 22. In each assembled pipe conduit is at least one length of flexible pipe 24. This length is formed or provided with means for securing the pipe lengths by clamp skid apparatus. This skid and clamp is shown in greater detail in other FIGS. but for general purposes is identified as 26. A simple clamp and skid is shown in FIGS. 11 and 12 and a skid clamp with extensible handle means is shown in FIGS. 2 through 5. The wheels 22 not only support the pipe lengths above a support surface generally identified as 28 but the wheels provide means for ease of movement and manipulation. This support surface is only diagrammatically indicated but usually includes a grid of wire mesh, lath or rods that are disposed above the lower receiving and retaining surface so that the flowable concrete passes through the grid and entraps the grid to produce reinforced concrete. The specific improvements shown in the subsequent FIGS. pertain to the conduit concrete delivery system and means for manipulating the connected conduit.

Embodiment of FIGS. 2 through 5

Figure 2:
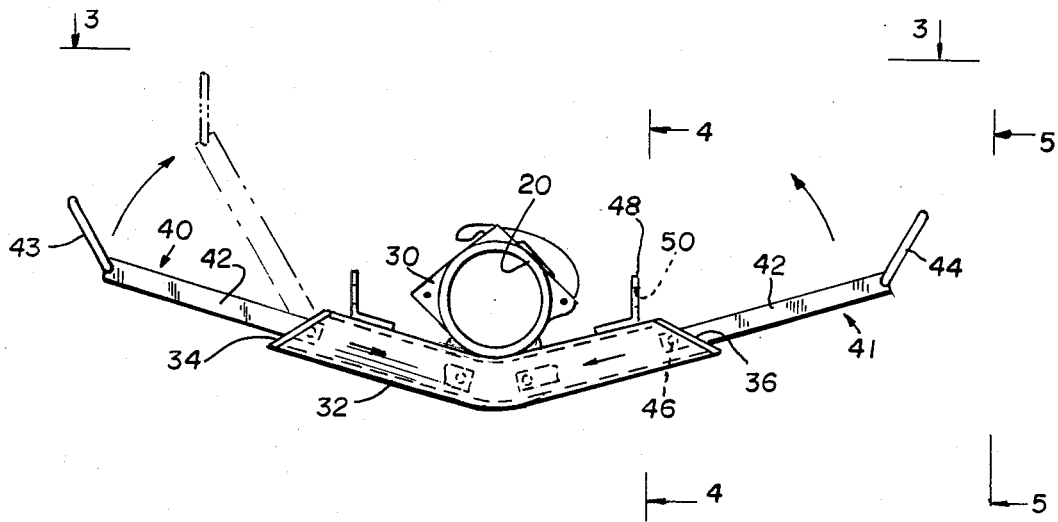
FIG. 2 represents a side view in an enlarged scale of a clamp skid for use with the conduit of FIG. 1, this view partially in section and diagrammatically showing a skid with manipulable manual lift means, and with a split clamp adapted for opening and closing and securing pipe ends so as to retain said pipe while the pipe is lifted and moved to a desired position.

In FIGS. 2 through 5 there is depicted a pipe clamp and skid. As shown, a standard cement pipe clamp 30 is hinged for ready securing of pipe lengths which may be rigid pipe lengths 20 or a flexible pipe 24. O-ring gaskets and grooves are not shown as such methods are well known. These clamps are commercially available with resilient gaskets or with O-rings often with special configurations which, with the specially-produced ends, provide a gasket seal. Clamp connectors provide for end-to-end assembly into conduits used in the delivery of fluid concrete under pressure. Such clamps are commercially available and sold to the trade. C & F Construction Forms, of West 60 North 151 Cardinal Avenue, P. O. Box 326, Cedarberg, Wis. 53012, makes these clamps and gaskets for working pressures of 500 pounds per square inch and greater. Among these coupling systems for coupling lengths of pipe in end-to-end arrangement are Con-Form Snap Couplings as illustrated in FIGS. 2 and 11. Each clamp 30 is welded to a V-shaped and bent length of pipe 32. As contemplated, this pipe is made from two inch schedule forty pipe. It is to be noted that each end of the pipe length is beveled to provide upward and inwardly sloped contours. These beveled ends are closed with end plates 34 and 36 in which are formed like rectangular slots 38 which provide a slide guide for a handle. The left handle is identified as 40 and the right handle is identified as 41.

The handles are made from like rectanglar steel bars 42 which are contemplated as one-half inch by one inch in cross section and about one foot long. At the outer ends of these bars handles are attached with like carrying grasp portions 43 and 44. The handle 40 is a mirror image of that identified as 41. Steel rod about one-half inch in diameter is bent into a loop and the ends are welded, brazed or otherwise fixedly secured to the bar ends to provide the upward cant of the grasp portions. Since these grasp portions often require or contemplate gloved grasping the handle grasp is contemplated as being about six inches wide and about four inches in depth.

Figure 4:
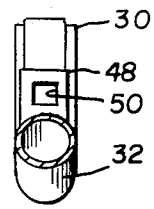
FIG. 4 represents a fragmentary and partly diagrammatic sectional end view of the clamp skid as taken on the line 4—4 of FIG. 2 and looking in the direction of the arrows.

As seen by the drawing, the bar portions 42 of handles 40 and 41 are adapted to be slid inwardly within the straight, outwardly extending bent portions of the length of pipe 32. These bar portions 42 are freely slideable within the pipe. The inner portion of the grasp portions 43 or 44 engages or approaches the plate ends 34 or 36. The inner ends of the bars 42 are drilled to each accept and retain a pin stop 46. Both inner ends of the bars 42 are drilled and like pins 46 are secured therein. Access apertures are provided in bent pipe 32 to allow insertion and removal of pin stops 46. A manipulating ear 48 is placed on each end on the bent pipe 32. Each ear has a square aperture 50 formed in the outwardly and upwardly extending leg. As depicted in FIG. 4, this aperture 50 is about one inch square. The ear is from a two-by-two inch angle about two inches in length and of substantial thickness such as about one-half inch.

When used as a skid, the assembly of FIG. 2 through 5 has the handles 40 and 41 moved to the inner condition. When the apparatus is required to lift or manually move the pipe conduit, the handles 40 and 41 are grasped and moved outwardly until the pin stops 46 engage an end plate 34 or 36. At this outward condition the slot 38 allows the bar portions 42 to be swung upwardly about thirty degrees to provide a more comfortable lift height. Clamp 30 is manipulated to open the clamp when the pipe conduit is to be taken apart.

Figure 7:
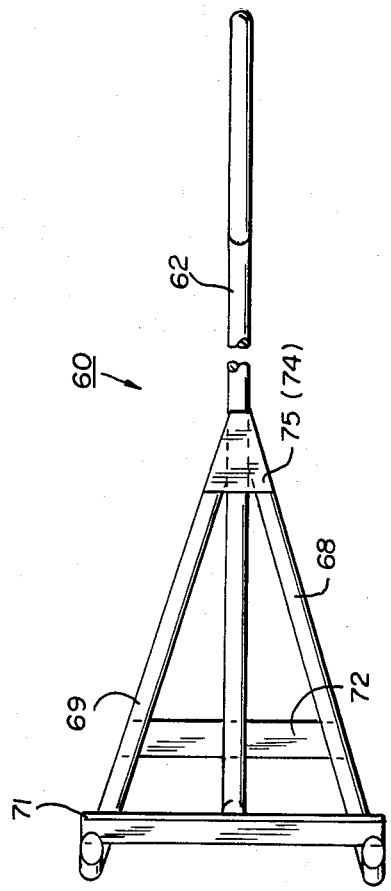
FIG. 7 represents a top or plan view of the pipe skid maneuvering tool of FIG. 6, this view taken on the line 7—7 thereof and looking in the direction of the arrows.
Figure 6:
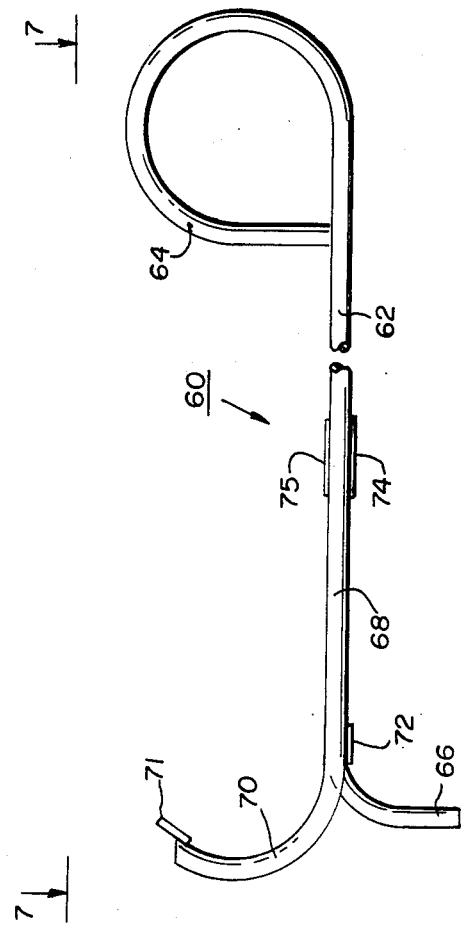
FIG. 6 represents a side view in an enlarged scale and showing a pipe skid maneuvering tool for engaging and moving a clamp skid.
Figure 8:
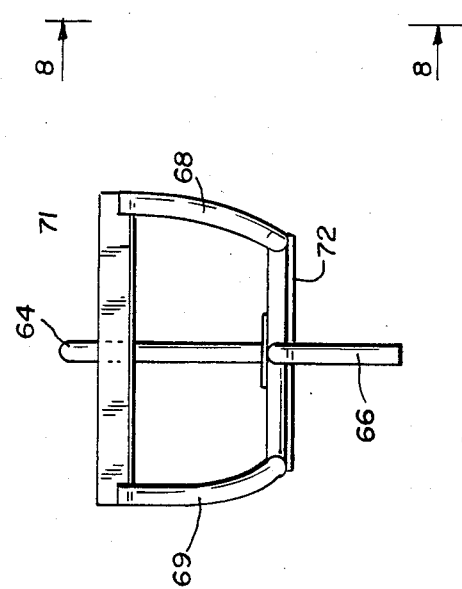
FIG. 8 represents an end view of the pipe skid manuvering tool of FIG. 6, this view taken on the line 8—8 thereof and looking in the direction of the arrows.

Embodiment of FIGS. 6, 7 and 8

In FIGS. 6, 7 and 8 there is shown a hook tool that is particularly useful for the engaging and moving of concrete conduit pipe. As depicted, this hook tool is generally identified as 60 and is depicted as a weldment from one-half inch steel rod. A main member 62 has its right or grasping end 64 bent into a loop about five inches in diameter. The other end is formed into a downwardly extending finger 66. A pair of supporting and divergent leg members 68 and 69 are provided and at their right ends are contoured to diverge while lying adjacent the main member. As depicted, the leg members 68 and 69 are separate bar portions and the main member 62 does not provide any portion of the hook curve. Since these portions diverge at substantially equal extents these portions may be described as bifurcated since only two portions are shown. This is not to preclude making the hook tool with a greater number of leg members than shown. The leg members are curved into arc segments 70 with a contemplated radius of about two and one-half inches. The upper and upwardly extending ends of leg members 68 and 69 are connected with a welded-on bar member 71. A lower reinforcing bar 72 is welded in place and assists in retaining and rigidifying the main member 62 and the two leg members 68 and 69. Reinforcing tabs 74 and 75 secure the right ends of legs members 68 and 69 against member 62.

Use and Operation of the Hook Tool of FIGS. 6, 7 and 8

This hook tool, although quite rugged, is sufficiently light in weight to allow an attendant to grasp and use the tool for moving the pipe conduit. At intermediate points or portions the arc segment 70 is caused to engage the pipe conduit. This hook tool 60 may be placed as shown or inverted according to the desires of the user. The downwardly extending finger 66 is adapted to enter the slot 50 in the ear 48 of the skid of FIG. 2. When the hook tool of FIGS. 6, 7 and 8 is used with the skid-clamp of FIG. 2 it is contemplated that the handles 40 and 41 are in their stored condition. When the hook tool is used, the wheels 22 and skids are contemplated to be present and undue exertion of effort is not required.

Figure 9:
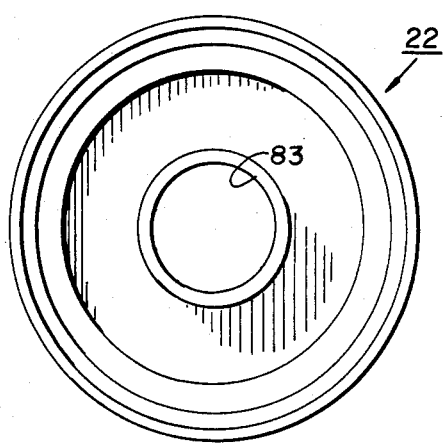
FIG. 9 represents a side view, partly diagrammatic, of a wheel having its center portion altered to include and provide a welded in place sleeve for free rotation of the wheel around a pipe, this view taken on the line 9—9 of FIG. 10 and looking in the direction of the arrows.
Figure 10:
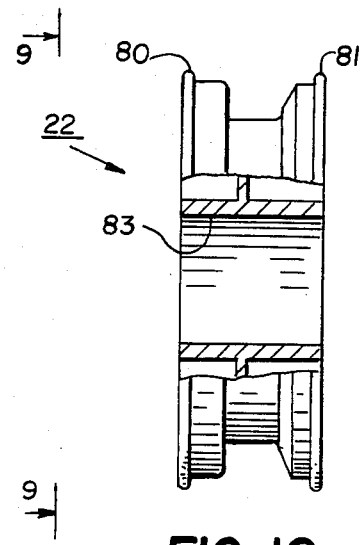
FIG. 10 represents an end view of the wheel of FIG. 9.

Wheel of FIGS. 9 and 10

In FIGS. 9 and 10 there is depicted a wheel 22 which is conventionally made from auto wheels usually absent the tires. These wheels are available in auto salvage yards at low cost and conventionally have two retaining outer flange portions 80 and 81. The center portion of this wheel 22 is burned out to provide an aperture in which a length of pipe or tubing 83 is secured as by welding or brazing. This length of tubing provides a sleeve which is contemplated as a loose fit on the outer diameter of pipe conduit. For example, with the conduit made of four inch pipe the interior diameter of the sleeve member 83 is at least five inches. If the pipe conduit is greater or less than four inches the sleeve is made accordingly, but in no instance is the sleeve a snug fit on the pipe conduit.

Use and Operation of the Wheel of FIGS. 9 and 10

The largest standard wheel found abundantly is for a sixteen inch tire and this is the size normally used. Tires may be mounted on these rims if added clearance or cushioning of the conduit is desired. The sleeve size is made to suit the pipe conduit and the presence of a tire on the wheel is in accordance with the surface to be accommodated. Wire grid or mesh often is better served with wheels without tires. Certain other applications lend themselves to the presence of tires. This is a matter of condition rather than patentable distinction.

Embodiment of FIGS. 11 and 12

Referring next and finally to the skid-clamp depicted in FIGS. 11 and 12, it is to be noted that the skid-clamp of FIG. 2 is modified to the extent that extending handle means 40 and 41 are not required. A less expensive skid-clamp not employing extensible handle means is shown in this embodiment in which is provided a pipe clamp 90 similar or identical to clamp 30 in FIG. 2. This clamp is attached as by welding to a skid member or plate 92 which at least at its ends is canted upwardly to provide a skid means for allowing the clamp to be dragged over the support surface whether wire mesh, rods, rough concrete or the like. Clamp 90 is conventional as for securing concrete conduit in an end-to-end relationship and is attached to the skid member as by welding, brazing, epoxy or the like. Whether one member (as shown) or two or more skid members are attached to the clamp it is contemplated that as in FIG. 2 the skid member is normal to the axis of the pipe conduit.

Use and Operation of the Skid Clamp of FIGS. 11 and 12

The skid-clamp device shown in FIGS. 11 and 12 is contemplated to prevent wear and accidental opening of the clamp during use and positioning of the conduit during operation. The use of wheels 22 to support the pipe conduit is contemplated but the skid-clamp insures that this attached clamp is not damaged and that the integrity of the conduit, as to the clamping, is maintained.

Concrete conduits may be as small as three inch pipe but the more common sizes are four and five inches in diameter. The clamps in the embodiments of FIGS. 2 and 11 are contemplated to secure the lengths of pipe in an end-to-end relationship under produced pressures. Pressure at the pump, of course, is much greater. The skid-clamp of FIG. 2 has not only the lift handles that are retractable but also has the ears 48 which provide engaging means for the finger 66 of the hook tool of FIG. 6. The cleaning of this conduit after use is by methods well known in the trade.

The pipe, whether rigid or flexible, is contemplated to be of that construction which is acceptable to all safety control agencies. The wheel shown in FIGS. 9 and 10 is conventionally provided with a tire at the discharge end since the conduit at the discharge outlet often has pulsating actions. Tires are also used on wheels when and where the conduit is moved over high divider portions requiring extra ability to transfer the conduit from one area to another. One wheel is usually used with one pipe length and is moved in place on the pipe length at the time of assembly and before clamping.

The concrete at the pump exit may be several hundreds pounds per square inch but in the conduit is usually from one to three hundred pounds per square inch. The end of the concrete delivery system usually has a flexible pipe arranged to be manipulated by an attendant for delivery of the flowable mixture to a precise spot or location. Floor areas usually have reinforcing means such as grid or mesh of metal, usually steel. Highway and driveways usually have reinforcing rods and walls have metal lathe. Whatever type surface is to receive concrete presents problems of movement and protection of the clamp as to its closing and wear. With or without tires the wheels enable ease of movement and flexible pipe lengths enable manipulation by one or more hook tools as actuated by an attendant or attendants.

The hook tool in its bifurcated configuration and construction provides grasping means for an attendant to engage the conduit at its midlength and move the pipe conduit to a desired position. The two clamp skids provide the best mode devised by the Applicant to protect the clamp against unwanted wear by dragging and against damage of the clamped joint. The hook tool may be used with an apertured ear 50 of the skid-clamp of FIG. 2 to manipulate the skid and conduit to the desired position. Although a great convenience, the hook tool of FIGS. 6, 7 and 8 is not required in every instance as the attendant can and may roll the pipe conduit by the wheel and with hand manipulation. This hook tool is not used when working in close confines or other situations where the use of said hook tool would be inconvenient.

Terms such as "left", "right", "up", "down", "top", "bottom", "front", "back", "in", "out" and the like are applicable to the embodiments shown and described in conjunction with the drawings. These terms are merely for the purposes of description and do not necessarily apply to the position in which the flowable concrete delivery system and connected pipe lengths may be constructed or used.

While a particular embodiment of the concrete delivery apparatus has been shown, the skids used therewith are shown in two embodiments. A skid hook tool is shown and described in a particular embodiment but it is to be understood the invention is not limited thereto and protection is sought to the broadest extent the prior art allows.

What is claimed is:

1. A flowable concrete delivery apparatus including a high pressure conduit pipe of a selected length and diameter, having a discharge end said delivery apparatus including:
   (a) a plurality of lengths of rigid pipe assembled in an end-to-end conduit relationship;
   (b) at least one length of flexible pipe interposed and connected into said conduit so as to provide and enable said conduit to be bent at said flexible pipe length so that a discharge end may be moved to a selected and desired position; said lengths of pipe having their ends configured to accept a resilient gasket and with shoulder means for retaining of said ends in said assembled end-to-end relationship by a clamp and a clamp engaging said shoulder means and a gasket between said ends,
   (c) a skid member affixed to a clamp which provides means as to allow the clamp to be opened and closed to secure and release the coupled pipe ends while said skid protects the the clamp and coupled ends of the pipe against dragging contact and wear on a support surface;

(d) a plurality of freely rotating wheels interposed on the pipe lengths, each wheel having an attached sleeve means which provides a free fit of the wheel on the outer diameter of a rigid pipe length, and (e) manipulating means for locally moving said concrete delivery apparatus and pipe length portions thereof, said means including means for grasping by an attendant without accidental opening of said clamp or clamps during manipulation of the concrete delivery apparatus by and with said attendant's efforts to move the conduit pipe to a desired delivery position.

2. A flowable concrete delivery apparatus, as in claim 1, in which said manipulating means includes a hook tool which has a shank with a formed handle at one end and the other end is made with bifurcated extension members providing at one of their ends with spaced-apart leg members formed into substantially hook shaped configurations, said hooks shaped and sized to engage the outer diameter of a pipe length, said leg members connected at their hook shaped ends to each other by a support bar and at the bifurcated connection with said shank by a reinforcing means.

3. A flowable concrete delivery apparatus as in claim 2 in which the hook tool is made of steel rod with the handle end bent into a loop to provide grasping means and at the other end bent into an extending finger of determined size and extent.

4. A flowable concrete delivery apparatus as in claim 3 in which the hook tool includes reinforcing tab portions providing the reinforcing means at the bifurcated connection, this reinforcing tab portion welded at the bifurcated joint and another bar reinforcement connected to said extension members and said shank adjacent said hook shaped ends so as to establish and reinforce the leg members and shank.

5. A flowable concrete delivery apparatus as in claim 3 in which the extending finger is substantially normal to the axis of the shank of the handle and is disposed substantially opposite to the hook configuration portion.

6. A flowable concrete delivery apparatus as in claim 1 in which the clamp and skid member carrying the pipe lengths include a metal member attached to the clamp at the midlength of the skid and with the ends of said skid canted sufficiently upwards to insure that the ends of said skid do not engage the support surface.

7. A flowable concrete delivery apparatus as in claim 6 in which the clamp and skid member includes a skid as a steel plate formed into a shallow V-shape and with the ends of the skid plate additionally shaped to provide deflecting means for non-engagement of wire mesh and the like as and when the clamp and skid is dragged over the support surface.

8. A flowable concrete delivery apparatus as in claim 6 in which the steel skid plate has each end curved upwardly and inwardly toward the secured and attached clamp.

9. A flowable concrete delivery apparatus as in claim 1 in which the manipulating means includes forming the skid with two movable handle members with metal main portions and outer handle grasping means, these members carried by said skid in retainer means and movable from a stored condition and to an outer lifting and manipulating condition whereat a stop means comes in way of the skid retainer means to limit the outer movement of the movable handle members.

10. A flowable concrete delivery apparatus as in claim 9 in which the retainer means of the skid is a tubular length which is bent into a shallow V-shape with the clamp fixedly attached and within said bend and the main metal portions are steel bars slideable within outwardly extending straight lengths of metal tubing and with the ends of said tubing closed with end plates or caps each having a formed aperture disposed to allow said steel bar to be slideable therethrough and with a transverse stop pin secured at the inner end of each bar, each of said pins providing an outer limit stop for the outward movement of a handle.

11. A flowable concrete delivery apparatus as in claim 10 in which the metal bar is substantially rectangular in cross section and the formed aperture in the end plate is sized to provide a slide fit for said bar.

12. A flowable concrete delivery apparatus as in claim 11 in which the end plates in which the aperture is formed are attached to the end of the tubular length and the tubular length is cut at both ends at a bevel disposed to cant the attached plate end outwardly and upwardly.

13. A flowable concrete delivery apparatus as in claim 12 in which there is additionally attached to each tubular length and adjacent the outer end thereof a manipulating ear, each ear having a formed aperture therein for engaging by extending finger means on a hook tool.

14. A flowable concrete delivery apparatus as in claim 1 in which the wheels have flanges which are adapted to retain tires or may be used with said two exposed flange portions, and with the central portion of the wheel having an attached pipe length about equal to the distance between the flanges, this pipe length secured to the central portion of the wheel by welding.

* * * * *